US008027453B2

(12) United States Patent
Lurie

(10) Patent No.: US 8,027,453 B2
(45) Date of Patent: *Sep. 27, 2011

(54) SYSTEM AND METHOD FOR AN ONLINE SPEAKER PATCH-THROUGH

(75) Inventor: Steven Lurie, San Francisco, CA (US)

(73) Assignee: UTBK, Inc., Dover, DE (US)

( * ) Notice: Subject to any disclaimer, the term of this patent is extended or adjusted under 35 U.S.C. 154(b) by 1107 days.

This patent is subject to a terminal disclaimer.

(21) Appl. No.: 11/775,207

(22) Filed: Jul. 9, 2007

(65) Prior Publication Data

US 2009/0161856 A1   Jun. 25, 2009

Related U.S. Application Data

(63) Continuation of application No. 09/764,021, filed on Jan. 16, 2001, now Pat. No. 7,289,623.

(51) Int. Cl.
*H04M 7/02* (2006.01)
*H04W 4/06* (2009.01)

(52) U.S. Cl. .................. 379/221.02; 340/5.74; 370/250; 370/278; 455/12.1; 455/428; 455/432.1; 455/435.2; 455/456.3; 701/214; 705/7.25; 709/206; 709/227; 714/12

(58) Field of Classification Search .................. 370/342, 370/250, 278; 379/221.02, 114.05; 705/26, 705/7.25; 709/227, 206; 455/428, 12.1, 455/432.1, 435.2, 456.3, 466; 340/5.74; 701/214; 714/12

See application file for complete search history.

(56) References Cited

U.S. PATENT DOCUMENTS

| 4,313,035 A | 1/1982 | Jordan et al. |
|---|---|---|
| 4,577,065 A | 3/1986 | Frey et al. |
| 4,604,686 A | 8/1986 | Reiter et al. |
| 4,631,428 A | 12/1986 | Grimes |
| 4,645,873 A | 2/1987 | Chomet |
| 4,677,434 A | 6/1987 | Fascenda |
| 4,677,659 A | 6/1987 | Dargan |
| 4,723,283 A | 2/1988 | Nagasawa et al. |
| 4,741,025 A | 4/1988 | Maruyama et al. |

(Continued)

FOREIGN PATENT DOCUMENTS

AU   699785   5/1995

(Continued)

OTHER PUBLICATIONS

Keen.Com, "The Most Popular U.S. Question and Answer Marketplace Goes International 90 Days After Launch," PR Newswire, Mar. 13, 2000.

(Continued)

*Primary Examiner* — Gerald Gauthier
(74) *Attorney, Agent, or Firm* — Greenberg Traurig, LLP

(57) ABSTRACT

Systems and methods described herein may be incorporated into a "service marketplace" system that matches users with potential information or service providers and establishes a real-time communications connection between the user and a selected information provider. In one embodiment, an alternate is selected for the user when the service provider that the user is trying to connect with cannot be reached. In an alternative embodiment, the alternates can be used in conjunction with the service provider that does connect with the user in order to provide a second opinion or possibly deeper background information. In one embodiment, the service providers can either be a live person at the other end of the connection or a recording.

19 Claims, 8 Drawing Sheets

U.S. PATENT DOCUMENTS

| | | | |
|---|---|---|---|
| 4,751,669 A | 6/1988 | Sturgis et al. | |
| 4,752,675 A | 6/1988 | Zetmeir | |
| 4,757,267 A | 7/1988 | Riskin | |
| 4,796,293 A | 1/1989 | Blinken et al. | |
| 4,817,129 A | 3/1989 | Riskin | |
| 4,847,890 A | 7/1989 | Solomon et al. | |
| 4,878,239 A | 10/1989 | Solomon et al. | |
| 4,969,185 A | 11/1990 | Dorst et al. | |
| 5,017,917 A | 5/1991 | Fisher et al. | |
| 5,058,152 A | 10/1991 | Solomon et al. | |
| 5,099,510 A | 3/1992 | Blinken, Jr. et al. | |
| 5,148,474 A | 9/1992 | Haralambopoulos et al. | |
| 5,155,743 A | 10/1992 | Jacobs | |
| 5,182,769 A | 1/1993 | Yamaguchi et al. | |
| 5,206,903 A | 4/1993 | Kohler et al. | |
| 5,239,294 A * | 8/1993 | Flanders et al. | 340/5.74 |
| 5,319,542 A | 6/1994 | King, Jr. et al. | |
| 5,325,424 A | 6/1994 | Grube | |
| 5,339,358 A | 8/1994 | Danish et al. | |
| 5,347,632 A | 9/1994 | Filepp et al. | |
| 5,359,508 A | 10/1994 | Rossides | |
| 5,361,295 A | 11/1994 | Solomon et al. | |
| 5,369,694 A | 11/1994 | Bales et al. | |
| 5,373,549 A | 12/1994 | Bales et al. | |
| 5,436,957 A | 7/1995 | McConnell | |
| 5,448,625 A | 9/1995 | Lederman | |
| 5,453,352 A | 9/1995 | Tachibana | |
| 5,459,779 A | 10/1995 | Backaus et al. | |
| 5,469,497 A | 11/1995 | Pierce et al. | |
| 5,483,352 A | 1/1996 | Fukuyama et al. | |
| 5,483,588 A | 1/1996 | Eaton et al. | |
| 5,497,502 A | 3/1996 | Castille | |
| 5,524,146 A | 6/1996 | Morrisey et al. | |
| 5,537,314 A | 7/1996 | Kanter | |
| 5,539,735 A | 7/1996 | Moskowitz | |
| 5,539,813 A | 7/1996 | Jonsson | |
| 5,544,237 A | 8/1996 | Bales et al. | |
| 5,555,298 A | 9/1996 | Jonsson | |
| 5,555,444 A * | 9/1996 | Diekelman et al. | 455/12.1 |
| 5,557,677 A | 9/1996 | Prytz | |
| 5,559,875 A | 9/1996 | Bieselin et al. | |
| 5,561,836 A * | 10/1996 | Sowles et al. | 455/428 |
| 5,574,780 A | 11/1996 | Andruska et al. | |
| 5,574,781 A | 11/1996 | Blaze | |
| 5,589,892 A | 12/1996 | Knee et al. | |
| 5,590,197 A | 12/1996 | Chen et al. | |
| 5,596,634 A | 1/1997 | Fernandez et al. | |
| 5,602,905 A | 2/1997 | Mettke | |
| 5,604,803 A | 2/1997 | Aziz | |
| 5,608,786 A | 3/1997 | Gordon | |
| 5,615,213 A | 3/1997 | Griefer | |
| 5,619,148 A | 4/1997 | Guo | |
| 5,619,555 A | 4/1997 | Fenton et al. | |
| 5,619,570 A | 4/1997 | Tsutsui | |
| 5,619,725 A | 4/1997 | Gordon | |
| 5,619,991 A | 4/1997 | Sloane | |
| 5,623,536 A | 4/1997 | Solomon et al. | |
| 5,634,012 A | 5/1997 | Stefik et al. | |
| 5,638,432 A | 6/1997 | Wille et al. | |
| 5,644,715 A | 7/1997 | Baugher | |
| 5,651,058 A | 7/1997 | Hackett-Jones et al. | |
| 5,659,742 A | 8/1997 | Beattie et al. | |
| 5,668,953 A | 9/1997 | Sloo | |
| 5,675,734 A | 10/1997 | Hair | |
| 5,689,553 A | 11/1997 | Ahuja et al. | |
| 5,694,163 A | 12/1997 | Harrison | |
| 5,694,549 A | 12/1997 | Carlin et al. | |
| 5,701,419 A | 12/1997 | McConnell | |
| 5,710,887 A | 1/1998 | Chelliah et al. | |
| 5,712,979 A | 1/1998 | Graber et al. | |
| 5,715,314 A | 2/1998 | Payne et al. | |
| 5,717,860 A | 2/1998 | Graber et al. | |
| 5,718,247 A | 2/1998 | Frankel | |
| 5,721,763 A | 2/1998 | Joseph et al. | |
| 5,722,418 A | 3/1998 | Bro | |
| 5,724,424 A | 3/1998 | Gifford | |
| 5,724,521 A | 3/1998 | Dedrick | |
| 5,734,961 A | 3/1998 | Castille | |
| 5,740,231 A | 4/1998 | Cohn et al. | |
| 5,740,549 A | 4/1998 | Reilly et al. | |
| 5,745,681 A | 4/1998 | Levine et al. | |
| 5,748,493 A * | 5/1998 | Lightfoot et al. | 709/227 |
| 5,768,348 A | 6/1998 | Solomon et al. | |
| 5,768,521 A | 6/1998 | Dedrick | |
| 5,774,534 A | 6/1998 | Mayer | |
| 5,778,367 A | 7/1998 | Wesinger, Jr. et al. | |
| 5,781,894 A | 7/1998 | Patrecca et al. | |
| 5,794,210 A | 8/1998 | Goldhaber et al. | |
| 5,794,221 A | 8/1998 | Egendorf | |
| 5,802,502 A | 9/1998 | Gell et al. | |
| 5,809,119 A | 9/1998 | Tonomura et al. | |
| 5,809,145 A | 9/1998 | Slik et al. | |
| 5,812,769 A | 9/1998 | Graber et al. | |
| 5,818,836 A | 10/1998 | DuVal | |
| 5,819,092 A | 10/1998 | Ferguson et al. | |
| 5,819,267 A | 10/1998 | Uyama | |
| 5,819,271 A | 10/1998 | Mahoney et al. | |
| 5,819,285 A | 10/1998 | Damico et al. | |
| 5,825,869 A | 10/1998 | Brooks et al. | |
| 5,825,876 A | 10/1998 | Peterson, Jr. | |
| 5,832,523 A | 11/1998 | Kanai et al. | |
| 5,835,896 A | 11/1998 | Fisher et al. | |
| 5,841,763 A | 11/1998 | Leondires et al. | |
| 5,842,212 A | 11/1998 | Ballurio et al. | |
| 5,845,265 A | 12/1998 | Woolston | |
| 5,850,433 A | 12/1998 | Rondeau | |
| 5,860,068 A | 1/1999 | Cook | |
| 5,862,223 A | 1/1999 | Walker et al. | |
| 5,864,871 A | 1/1999 | Kitain et al. | |
| 5,870,744 A | 2/1999 | Sprague | |
| 5,878,130 A | 3/1999 | Andrews et al. | |
| 5,884,032 A | 3/1999 | Bateman et al. | |
| 5,884,272 A | 3/1999 | Walker et al. | |
| 5,884,282 A | 3/1999 | Robinson | |
| 5,889,774 A | 3/1999 | Mirashrafi et al. | |
| 5,890,138 A | 3/1999 | Godin et al. | |
| 5,893,077 A | 4/1999 | Griffin | |
| 5,901,214 A | 5/1999 | Shaffer et al. | |
| 5,903,635 A | 5/1999 | Kaplan | |
| 5,903,877 A | 5/1999 | Berkowitz et al. | |
| 5,907,677 A | 5/1999 | Glenn et al. | |
| 5,911,132 A | 6/1999 | Sloane | |
| 5,914,951 A | 6/1999 | Bentley et al. | |
| 5,924,082 A | 7/1999 | Silverman et al. | |
| 5,937,390 A | 8/1999 | Hyodo | |
| 5,940,471 A | 8/1999 | Homayoun | |
| 5,940,484 A | 8/1999 | DeFazio et al. | |
| 5,943,422 A | 8/1999 | Van Wie et al. | |
| 5,946,646 A | 8/1999 | Schena et al. | |
| 5,948,054 A | 9/1999 | Nielsen | |
| 5,960,416 A | 9/1999 | Block | |
| 5,974,141 A | 10/1999 | Saito | |
| 5,974,398 A | 10/1999 | Hanson et al. | |
| 5,982,863 A | 11/1999 | Smiley et al. | |
| 5,987,102 A | 11/1999 | Elliott et al. | |
| 5,987,118 A | 11/1999 | Dickerman et al. | |
| 5,987,430 A | 11/1999 | Van Horne et al. | |
| 5,991,394 A | 11/1999 | Dezonno et al. | |
| 5,999,609 A | 12/1999 | Nishimura | |
| 5,999,611 A | 12/1999 | Tatchell et al. | |
| 6,006,197 A | 12/1999 | D'Eon et al. | |
| 6,011,794 A | 1/2000 | Mordowitz et al. | |
| 6,014,439 A | 1/2000 | Walker et al. | |
| 6,014,644 A | 1/2000 | Erickson | |
| 6,016,478 A | 1/2000 | Zhang et al. | |
| 6,026,087 A | 2/2000 | Mirashrafi et al. | |
| 6,026,148 A | 2/2000 | Dworkin et al. | |
| 6,026,400 A | 2/2000 | Suzuki | |
| 6,028,601 A | 2/2000 | Machiraju et al. | |
| 6,029,141 A | 2/2000 | Bezos et al. | |
| 6,035,021 A | 3/2000 | Katz | |
| 6,046,762 A | 4/2000 | Sonesh et al. | |
| 6,055,513 A | 4/2000 | Katz et al. | |
| 6,058,379 A | 5/2000 | Odom et al. | |
| 6,064,978 A | 5/2000 | Gardner et al. | |
| 6,078,866 A | 6/2000 | Buck et al. | |
| 6,108,493 A | 8/2000 | Miller et al. | |

| | | | | | | |
|---|---|---|---|---|---|---|
| 6,130,933 | A | 10/2000 | Miloslavsky | 6,704,403 B2 | 3/2004 | Lurie et al. |
| 6,131,085 | A | 10/2000 | Rossides | 6,731,625 B1 | 5/2004 | Eastep et al. |
| 6,144,670 | A | 11/2000 | Sponaugle et al. | 6,741,691 B1 | 5/2004 | Ritter et al. |
| 6,167,379 | A | 12/2000 | Dean et al. | 6,748,217 B1* | 6/2004 | Hunzinger et al. ........ 455/435.2 |
| 6,167,449 | A | 12/2000 | Arnold et al. | 6,757,364 B2 | 6/2004 | Newkirk |
| 6,173,279 | B1 | 1/2001 | Levin et al. | 6,771,760 B1 | 8/2004 | Vortman et al. |
| 6,175,619 | B1 | 1/2001 | DeSimone | 6,775,359 B1 | 8/2004 | Ron et al. |
| 6,185,194 | B1 | 2/2001 | Musk et al. | 6,798,753 B1 | 9/2004 | Doganata et al. |
| 6,185,289 | B1 | 2/2001 | Hetz et al. | 6,801,899 B2 | 10/2004 | Lauffer |
| 6,188,673 | B1 | 2/2001 | Bauer et al. | 6,807,532 B1 | 10/2004 | Kolls |
| 6,188,761 | B1 | 2/2001 | Dickerman et al. | 6,807,571 B2 | 10/2004 | Hatano et al. |
| 6,192,050 | B1 | 2/2001 | Stovall | 6,836,225 B2 | 12/2004 | Lee et al. |
| 6,199,096 | B1 | 3/2001 | Mirashrafi et al. | 6,839,737 B1 | 1/2005 | Friskel |
| 6,208,857 | B1* | 3/2001 | Agre et al. .................... 455/428 | 6,865,540 B1 | 3/2005 | Faber et al. |
| 6,212,192 | B1 | 4/2001 | Mirashrafi et al. | 6,898,435 B2 | 5/2005 | Milman |
| 6,212,268 | B1 | 4/2001 | Nielsen | 6,910,159 B2 | 6/2005 | Phillips et al. |
| 6,216,111 | B1 | 4/2001 | Walker et al. | 6,968,174 B1 | 11/2005 | Trandal et al. |
| 6,223,165 | B1 | 4/2001 | Lauffer | 6,980,964 B1* | 12/2005 | Cocotis et al. ............... 705/7.25 |
| 6,230,287 | B1 | 5/2001 | Pinard et al. | 6,982,962 B1* | 1/2006 | Lunsford et al. ............. 370/278 |
| 6,233,566 | B1 | 5/2001 | Levine et al. | 6,990,183 B1 | 1/2006 | Holland et al. |
| 6,243,684 | B1 | 6/2001 | Stuart et al. | 7,013,280 B2 | 3/2006 | Davis et al. |
| 6,248,946 | B1 | 6/2001 | Dwek | 7,031,697 B2 | 4/2006 | Yang et al. |
| 6,259,774 | B1 | 7/2001 | Miloskavsky | 7,032,030 B1 | 4/2006 | Condignotto |
| 6,266,651 | B1 | 7/2001 | Woolston | 7,046,782 B2 | 5/2006 | Miller |
| 6,269,336 | B1 | 7/2001 | Ladd et al. | 7,096,193 B1* | 8/2006 | Beaudoin et al. ............... 705/26 |
| 6,269,361 | B1 | 7/2001 | Davis et al. | 7,103,010 B2 | 9/2006 | Melideo |
| 6,282,515 | B1 | 8/2001 | Speicher | 7,143,171 B2* | 11/2006 | Eriksson et al. ............... 709/227 |
| 6,292,799 | B1 | 9/2001 | Peek et al. | 7,212,615 B2 | 5/2007 | Wolmuth |
| 6,298,056 | B1 | 10/2001 | Pendse | 7,224,781 B2 | 5/2007 | Jacob et al. |
| 6,301,342 | B1 | 10/2001 | Ander et al. | 7,289,623 B2* | 10/2007 | Lurie ....................... 379/221.02 |
| 6,301,350 | B1 | 10/2001 | Henningson et al. | 7,340,262 B1* | 3/2008 | Gillespie et al. ............ 455/456.3 |
| 6,304,637 | B1 | 10/2001 | Mirashrafi et al. | 7,376,433 B1* | 5/2008 | Hose ............................ 455/466 |
| 6,310,941 | B1 | 10/2001 | Crutcher et al. | 7,912,744 B2* | 3/2011 | Combs et al. .................. 701/214 |
| 6,311,231 | B1 | 10/2001 | Bateman et al. | 2001/0012357 A1 | 8/2001 | Mirashrafi et al. |
| 6,314,402 | B1 | 11/2001 | Monaco et al. | 2001/0025274 A1 | 9/2001 | Zehr et al. |
| 6,314,454 | B1 | 11/2001 | Wang et al. | 2001/0026609 A1 | 10/2001 | Weinstein et al. |
| 6,323,894 | B1 | 11/2001 | Katz | 2001/0027481 A1 | 10/2001 | Whyel |
| 6,353,663 | B1 | 3/2002 | Stevens et al. | 2001/0029482 A1 | 10/2001 | Tealdi et al. |
| 6,381,325 | B1 | 4/2002 | Hanson | 2001/0032247 A1 | 10/2001 | Kanaya |
| 6,385,583 | B1 | 5/2002 | Ladd et al. | 2001/0036822 A1 | 11/2001 | Mead et al. |
| 6,389,541 | B1 | 5/2002 | Patterson | 2001/0037283 A1 | 11/2001 | Mullaney |
| 6,393,117 | B1 | 5/2002 | Trell | 2001/0044751 A1 | 11/2001 | Pugliese et al. |
| 6,393,412 | B1 | 5/2002 | Deep | 2001/0048737 A1 | 12/2001 | Goldberg et al. |
| 6,400,806 | B1 | 6/2002 | Uppaluru | 2002/0003867 A1 | 1/2002 | Rothschild et al. |
| 6,404,864 | B1 | 6/2002 | Evslin et al. | 2002/0010616 A1 | 1/2002 | Itzhaki |
| 6,404,877 | B1 | 6/2002 | Bolduc et al. | 2002/0024948 A1 | 2/2002 | Pendse |
| 6,404,884 | B1 | 6/2002 | Marwell et al. | 2002/0029241 A1 | 3/2002 | Yokono et al. |
| 6,408,278 | B1 | 6/2002 | Carney et al. | 2002/0038233 A1 | 3/2002 | Shubov et al. |
| 6,430,276 | B1 | 8/2002 | Bouvier et al. | 2002/0038293 A1 | 3/2002 | Seiden |
| 6,434,527 | B1 | 8/2002 | Horvitz | 2002/0042826 A1 | 4/2002 | Gaus et al. |
| 6,461,162 | B1 | 10/2002 | Reitman et al. | 2002/0059082 A1 | 5/2002 | Moczygemba |
| 6,463,136 | B1 | 10/2002 | Malik | 2002/0065959 A1 | 5/2002 | Kim et al. |
| 6,470,079 | B1 | 10/2002 | Benson | 2002/0069105 A1 | 6/2002 | do Rosario Botelho et al. |
| 6,470,317 | B1 | 10/2002 | Ladd et al. | 2002/0071423 A1 | 6/2002 | Mirashrafi et al. |
| 6,470,338 | B1 | 10/2002 | Rizzo et al. | 2002/0071426 A1 | 6/2002 | Karamchedu et al. |
| 6,477,246 | B1 | 11/2002 | Dolan et al. | 2002/0072974 A1 | 6/2002 | Pugliese et al. |
| 6,484,148 | B1 | 11/2002 | Boyd | 2002/0073207 A1 | 6/2002 | Widger et al. |
| 6,493,437 | B1 | 12/2002 | Olshansky | 2002/0087565 A1 | 7/2002 | Hoekman et al. |
| 6,493,671 | B1 | 12/2002 | Ladd et al. | 2002/0091607 A1 | 7/2002 | Sloan et al. |
| 6,493,673 | B1 | 12/2002 | Ladd et al. | 2002/0094074 A1* | 7/2002 | Lurie ....................... 379/221.02 |
| 6,504,920 | B1 | 1/2003 | Okon et al. | 2002/0095331 A1 | 7/2002 | Osman et al. |
| 6,510,417 | B1 | 1/2003 | Woods et al. | 2002/0107697 A1 | 8/2002 | Jensen |
| 6,513,013 | B1 | 1/2003 | Stephanou | 2002/0112005 A1 | 8/2002 | Namias |
| 6,519,570 | B1 | 2/2003 | Faber et al. | 2002/0116266 A1 | 8/2002 | Marshall |
| 6,523,010 | B2 | 2/2003 | Lauffer | 2002/0120554 A1 | 8/2002 | Vega |
| 6,529,878 | B2 | 3/2003 | De Rafael et al. | 2002/0128891 A1 | 9/2002 | McSherry |
| 6,535,506 | B1 | 3/2003 | Narain et al. | 2002/0133402 A1 | 9/2002 | Faber et al. |
| 6,539,359 | B1 | 3/2003 | Ladd et al. | 2002/0133571 A1 | 9/2002 | Jacob et al. |
| 6,546,372 | B2 | 4/2003 | Lauffer | 2002/0169836 A1 | 11/2002 | Hood et al. |
| 6,549,889 | B2 | 4/2003 | Lauffer | 2002/0191762 A1 | 12/2002 | Benson |
| 6,560,576 | B1 | 5/2003 | Cohen et al. | 2002/0193094 A1 | 12/2002 | Lawless et al. |
| 6,603,755 | B1* | 8/2003 | Parker ........................... 370/342 | 2003/0005126 A1 | 1/2003 | Schwartz et al. |
| 6,606,376 | B1 | 8/2003 | Trell | 2003/0041255 A1 | 2/2003 | Chen et al. |
| 6,609,106 | B1 | 8/2003 | Robertson | 2003/0043981 A1 | 3/2003 | Lurie et al. |
| 6,625,595 | B1 | 9/2003 | Anderson et al. | 2003/0046161 A1 | 3/2003 | Kamanger et al. |
| 6,636,590 | B1* | 10/2003 | Jacob et al. ............. 379/114.05 | 2003/0061094 A1 | 3/2003 | Banerjee et al. |
| 6,658,389 | B1 | 12/2003 | Alpdemir | 2003/0112944 A1 | 6/2003 | Brown et al. |
| 6,668,286 | B2 | 12/2003 | Bateman et al. | 2003/0115089 A1 | 6/2003 | Lurie |
| 6,691,093 | B2 | 2/2004 | Shell | 2003/0126205 A1 | 7/2003 | Lurie |

| | | |
|---|---|---|
| 2003/0140084 A1 | 7/2003 | D'Angelo |
| 2003/0220866 A1 | 11/2003 | Pisaris-Henderson |
| 2003/0223565 A1 | 12/2003 | Montemer |
| 2003/0225682 A1 | 12/2003 | Montemer |
| 2004/0006511 A1 | 1/2004 | Montemer |
| 2004/0010518 A1 | 1/2004 | Montemer |
| 2004/0023644 A1 | 2/2004 | Montemer |
| 2004/0038673 A1 | 2/2004 | Dunn et al. |
| 2004/0066927 A1 | 4/2004 | Horvath et al. |
| 2004/0083133 A1 | 4/2004 | Nicholas et al. |
| 2004/0096110 A1 | 5/2004 | Yogeshwar et al. |
| 2004/0100497 A1 | 5/2004 | Quillen et al. |
| 2004/0162757 A1 | 8/2004 | Pisaris-Henderson |
| 2004/0193740 A1 | 9/2004 | Kasmirsky et al. |
| 2004/0196833 A1 | 10/2004 | Dahan et al. |
| 2004/0199494 A1 | 10/2004 | Bhatt |
| 2004/0204997 A1 | 10/2004 | Blaser et al. |
| 2004/0234049 A1 | 11/2004 | Melideo |
| 2004/0234064 A1 | 11/2004 | Melideo |
| 2004/0236441 A1 | 11/2004 | Melideo |
| 2004/0252820 A1 | 12/2004 | Faber et al. |
| 2004/0254859 A1 | 12/2004 | Aslanian |
| 2004/0260413 A1 | 12/2004 | Melideo |
| 2005/0010795 A1 | 1/2005 | Tagawa et al. |
| 2005/0021744 A1 | 1/2005 | Haitsuka et al. |
| 2005/0044238 A1 | 2/2005 | Jacob et al. |
| 2005/0048961 A1 | 3/2005 | Ribaudo et al. |
| 2005/0065811 A1 | 3/2005 | Chu et al. |
| 2005/0071509 A1 | 3/2005 | Faber et al. |
| 2005/0080878 A1 | 4/2005 | Cunningham et al. |
| 2005/0086104 A1 | 4/2005 | McFadden |
| 2005/0114210 A1 | 5/2005 | Faber et al. |
| 2005/0119957 A1 | 6/2005 | Faber et al. |
| 2005/0165666 A1 | 7/2005 | Wong et al. |
| 2005/0203799 A1 | 9/2005 | Faber et al. |
| 2005/0209874 A1 | 9/2005 | Rossini |
| 2005/0216341 A1 | 9/2005 | Agarwal et al. |
| 2005/0216345 A1 | 9/2005 | Altberg et al. |
| 2005/0220289 A1 | 10/2005 | Reding |
| 2005/0222908 A1 | 10/2005 | Altberg et al. |
| 2005/0251445 A1 | 11/2005 | Wong et al. |
| 2006/0031516 A1 | 2/2006 | Kumer |
| 2006/0075104 A1 | 4/2006 | Kumer |
| 2006/0095343 A1 | 5/2006 | Clarke et al. |
| 2006/0184378 A1 | 8/2006 | Agarwal et al. |
| 2006/0215826 A1 | 9/2006 | Lurie et al. |
| 2007/0100799 A1 | 5/2007 | Rose et al. |
| 2009/0161856 A1* | 6/2009 | Lurie ................ 379/221.02 |

FOREIGN PATENT DOCUMENTS

| | | |
|---|---|---|
| EP | 1489529 | 12/2004 |
| GB | 2329046 | 3/1999 |
| JP | 409233441 | 9/1997 |
| JP | 409319812 | 12/1997 |
| JP | 2002007887 | 1/2002 |
| WO | 9705733 | 2/1997 |
| WO | 9802835 | 1/1998 |
| WO | 9804061 | 1/1998 |
| WO | 9813765 | 4/1998 |
| WO | 9838558 | 9/1998 |
| WO | 0057326 | 9/2000 |
| WO | 0073960 | 12/2000 |
| WO | 0101217 | 1/2001 |
| WO | 0120518 | 3/2001 |
| WO | 0127825 | 4/2001 |
| WO | 0128141 | 4/2001 |
| WO | 0144973 | 6/2001 |
| WO | 0184415 | 11/2001 |
| WO | 0213110 | 2/2002 |
| WO | 0237470 | 5/2002 |
| WO | 0244870 | 6/2002 |
| WO | 2005109287 | 11/2005 |

OTHER PUBLICATIONS

Alexander, Kelly King et al., "1-900 (Pay-For-Information Phone Services)," Baton Rouge Business Report, vol. 9, No. 20, pp. 23-27, Jul. 30, 1991.

Kempner, Matt, "SWM Seeking—The Net Rather than Newspapers," Atlanta Journal the Atlanta Constitution, p. Q1, Sep. 10, 2000.

Turco, Franco, "Legislation is Planned to Hem in 'Scooplines' Covers Revealing Rates, Blocking Service," Arizona Republic, Final Edition, Valley & State Section, p. B8, Jan. 16, 1988.

"Applying Technology News," Accounting Technology, p. 14, Feb./Mar. 1997.

"Connecting to On-Line Car Shoppers: Auto Sellers Use Netcall Internet Call-Button Technology to Turn 'Clicks' into Interactive Sales," Business Wire, p. 4089, Jul. 19, 1999.

"Keen.com raises $60 Million from Prestigious Investors and Strategic Partners Just 60 Days After Launch of Its Live Answer Community," Business Wire, Jan. 11, 2000.

"NetCall Internet Call Buttons Enhance E-Commerce Customer Service and Sales," PR Newswire, p. 7431, Aug. 9, 1999.

"Sell and Buy Advice Online," The Ottawa Citizen, p. D7, Nov. 29, 1999.

"TriNet's 'Help Me, I'm Stuck' Internet Voice Button Services Pushes Web Pages to Online Users," Business Wire, Mar. 25, 1998.

Addeo, E.J. et al., "An Experimental Multi-Media Bridging System," Frontiers in Computer Communications Technology, Computer Communications Review, vol. 17, No. 5, pp. 236-242, Aug. 11-13, 1987.

ADS-Click, "ADS-click Adds Skype-Based Pay-Per-Call Advertising Capabilities to Its Private-Labeled Solution, which will be Unveiled at ad:tech New York," Market Wire, Oct. 10, 2005.

Allexperts.Com, company information retrieved from http://www.allexperts.com, available at least by Apr. 9, 2000.

Angelo, Simon, "SurfBrains.com: Brains Online Save Time & Money," M2 Presswire, Jul. 11, 2000.

Answers.Com, company information retrieved from http://www.answers.com, available at least by Aug. 8, 2000.

Asthana, Abhaya et al., "A Small Domain Communications System for Personalized Shopping Assistance," IEEE International Conference on Personal Wireless Communications, Publication No. 0-7803-1996-6/94, pp. 199-203, Aug. 18, 1994.

Bazini, Liz, "UpSnap Selects LookSmart to Sell Premium Listings on Free 411 Service for Text-Enabled Cell Phones," Nov. 4, 2004.

Becker, Ralph, "ISDN Tutorial: Interfaces," retrieved from http://www.ralphb.net/ISDN/ifaces.html, available at least by Apr. 21, 2000.

Becker, Ralph, "ISDN Tutorial: Definitions," retrieved from http://www.ralphb.net/ISDN/defs.html, available at least by Apr. 21, 2000.

Broad, Doug et al., "Lucent Technology and Netscape Team to Deliver Lucent Ecommerce Solutions," Business Wire, Sep. 23, 1998.

Chimiak, William H. et al., "Multimedia Collaborative Remote Consultation Tools via Gigabit WAN in Teleradiology," IEEE 13th Annual International Phoenix Conference on Computers and Communications, pp. 417-423, Apr. 12-15, 1994.

Clark, Don, "Keen.com Plans Web Service Allowing Customers to Hold Private Phone Chats," Wall Street Jounral, Nov. 8, 1999.

Collett, Stacey et al., "Why Online Browsers Don't Become Buyers," Computerworld, vol. 33, No. 48, p. 14, Nov. 29, 1999.

Dalton, Gregory, "Rent-An-Expert on the Web," Information Week, p. 75, Sep. 6, 1999.

Davey, Tom, "Wheeling and Dealing Online," PC Week, vol. 13, No. 45, pp. 1, 129, Nov. 11, 1996.

De Lasser, Eleena, "When Business Plan and Real World Clash," Wall Street Journal, p. B1, Jun. 1999.

Drescher, Bob et al., "Aspect Telecommunications Integrates the Web into the Call Center to Deliver New Level of Customer Service," Business Wire, Aug. 5, 1996.

Dyson, Esther, "Information, Bid and Asked," Forbes, p. 92, Aug. 20, 1990.

EK, Brian, "Walker Digital Issued Landmark U.S. Patent No. 5,862,223 for Global Internet Marketplace for Experts", Business Wire, Jan. 26, 1999.

Ellis, James E., "For Telesphere's Clients, Dial 1-900 TUF LUCK," Business Week, pp. 88-89, Sep. 9, 1991.

Exp.Com, Inc., company information retrieved from http://www.exp.com, available at least by Sep. 20, 2000.

Expertcity.com, "About Us," company information retrieved from http://www.expertcity.com, available at least by Apr. 9, 2000.
Experts Exchange, Inc., company information retrieved from http://www.experts-exchange.com, available at least by Apr. 9, 2000.
Green Digital Media, Inc., Big Green Blog: Jan. 2005 Archives, Jan. 28-31, 2005.
Greenberg, Ken, "Jambo Launches to Connect People and Businesses from the Internet to the Phone," Market Wire, May 3, 2005.
Greenberg, Ken, "Jambo Names Netzero Co-founder Stacy Haitsuka to New Post of Chief Information Officer," Business Wire, Jul. 5, 2005.
Greenberg, Ken, "Jambo Receives $5 Million in Financing from Kline Hawkes & Co., Westlake Venture Partners, Others," Business Wire, Oct. 17, 2005.
Greenblatt, Ellen, "Have You Ever Wondered. . . . ," Datamation, p. 126, Oct. 1997.
Griffiths, J.W.R. et al., "Multimedia Communication in a Medical Environment," Singapore International Conference on Networks, pp. 166-171, Sep. 5, 1991.
Hase, Masahiko et al., "Advanced Videophone System Using Synchronized Video Filing Equipment," NTT Review, vol. 3, No. 4, pp. 29-36, Jul. 1991.
Healey, John, "From A-Z: You Can Sell Advice Online," San Jose Mercury News, retrieved from http://www.mercurycenter.com on Oct. 24, 2001.
Herman, Edith, "U.S. Courts to Launch First Federal 900 Service," Federal Computer Week, pp. 8, 10, Sep. 28, 1992.
Herzberg, Amir et al., "MiniPay: Charging Per Click on the Web," Computer Networks and ISDN Systems, vol. 29, pp. 939-951, Sep. 1997.
Hodgson, Cynthia, "Online Expert Databases & Services," Econtent, pp. 48-53, Dec. 1999.
Information Markets Corp., company information retrieved from http://www.infomarkets.com, available at least by Aug. 8, 2000.
Ingenio, Inc., "Keen: Your Personal Advisor," retrieved from http://www.keen.com, available at least by Feb. 4, 2006.
Ingenio, Inc., Press Archives for 2004, retrieved from http://www.ingenio.com on Feb. 21, 2006.
Intellectexchange.com, Inc., company information retrieved from http://www.intellectexchange.com, available at least by Aug. 8, 2000.
ISA/US, International Search Report for International Application No. PCT/US01/48284, 7 pages, May 13, 2002.
ISA/US, International Search Report for International Application No. PCT/US05/12061, 3 pages, Nov. 17, 2006.
Jambo, "Welcome to Jambo—The Leader in Pay-Per-Call Solutions," company information retrieved from http://www.jambo.com, available at least by Oct. 17, 2005.
Jarvie, Barbara, "Company Devoted to Hot-Line Support," Computer Reseller News, p. 48, Oct. 21, 1991.
Jingle Networks, Inc., "1-800-FREE411 Provides Two Great Opportunities to Acquire New Customers," available at least by Oct. 20, 2005.
Jingle Networks, Inc., "Introducing 1-800 FREE411: First Nationwide Free Telephone Directory Assistance Service," Sep. 20, 2005.
Kabeya, Kiyoshi et al., "A New Teleconsultation Terminal System Using ISDN," NTT Review, vol. 3, No. 4, pp. 37-43, Jul. 1991.
Kanellos, Michael, "Web Watch: Do You Want to Know the Meaning of Life?," Computer Reseller News, pp. 72-74, Mar. 3, 1997.
Keen.Com, "Keen.Com Launches First Live Answer Community, Connects People with Information to Share Over Their Standard Telephone," company press release, Nov. 8, 1999.
Keen.Com, company information retrieved from http://www.keen.com, available at least by 1999.
Kuehn, Richard A., "The Voice of Technology," Credit World, pp. 20-23, Jul. 1994.
Littleton, Linda, "HDD: A Helpdesk Database," Proceedings of the ACM SIGUCCS User Services Conference XXII, pp. 205-210, Oct. 16-19, 1994.

Ludwig, L.F. et al., "Laboratory for Emulation and Study of Integrated and Coordinated Media Communication," Conference on Office Information Systems, pp. 283-291, Mar. 23-25, 1988.
Melideo, John, U.S. Appl. No. 60/471,535 entitled "HyperDial," filed May 19, 2003.
Menn, Joseph, "An Expert? There's Now a Home for You on the Internet," Los Angeles Times, retrieved from http://www.denverpost.com on Oct. 24, 2001.
Mercalli, Franco et al., "The ESSAI Teleshopping System: An Example of a Broadband Multimedia Application," IEEE Global Telecommunications Conference, pp. 572-576, Nov. 28, 1994.
Moore, Michael et al., "USA Global Link Brings Interactively to Internet Shopping," Business Wire, Oct. 7, 1998.
Ott, Chris, "Making Good on the Information Economy," Denver Business Journal, vol. 51, No. 17, p. 27A, Dec. 17, 1999.
Pelline, Jeff, "Net Firm to Connect Users by Phone," CNET News.com, Nov. 8, 1999.
Qcircuit.com, company information retrieved from http://www.qcircuit.com, available at least by Aug. 8, 2000.
Reding, Craig et al., U.S. Appl. No. 09/596,466 entitled "Methods and Apparatus for Providing Telephone Support for Internet Sales," filed Jun. 19, 2000.
Robinson, John, "Attachmate Ready to Answer 'Net Questions," Network World, p. 37, Apr. 8, 1996.
Rogers, Michael et al, "Experts Abound at New Web Sites," Library Journal, pp. 22-24, Mar. 1, 2000.
Sairamesh, Jakka et al., "NetBazaar: Networked Electronic Markets for Trading Computation and Information Services," Second European Conference on Research and Advanced Technology for Digital Libraries, pp. 839-856, Sep. 21, 1998.
Tehrani, Rich, "e-Rip Van Winkle and the 60-second Nap," Call Center Solutions, vol. 18, No. 2, pp. 16-18, Aug. 1999.
Telecommunications Buyers Guide and Directory, Editor & Publisher, pp. 29TC-38TC, Feb. 12, 1994.
U.S. District Court, Southern District of New York, *Keen.com, Inc.* v. *InfoRocket.com, Inc.*, Preliminary Injunction Hearing, pp. 286-289, Jan. 8, 2002.
U.S. District Court, Southern District of New York, *Keen.com, Inc.* v. *InfoRocket.com, Inc.*: Complaint for Patent Infringement, Trade Dress Infringement and Unfair Competition; Demand for Jury Trial, Aug. 31, 2001.
University of Texas—Austin, information on the Electronic Emissary Project retrieved at www.tapr.org/emissary, available at least by Apr. 9, 2000.
Wagner, Mary, "Caring for Customers: Real-Time Text Chat and Telephony Provide Personalized Customer Support and Turn Queries into Sales Leads," Internet World Media, vol. 5, iss. 28, p. 30, Sep. 1, 1999.
Wasik, Joann M., "Information for Sale: Commercial Digital Reference and AskA SerVices," Virtual Reference Desk, http://www.vrd.org/AskA/commAskA.html, Sep. 20, 1999.
Wieland, Heidi et al., "Expertcity.com Launches Premier Online Marketplace for Expert Services," PR Newswire, Aug. 30, 1999.
Wood, Christina, "Hidden Cost of Tech Support," PC World, pp. 143-152, 156, May 1995.
European Patent Office, Search Report for European Patent Application No. EP4253389.3, Sep. 17, 2004.
Sterling, Greg, "Ingenio's Ether—Pay Per Professional Advice," Search Engine Journal, Mar. 3, 2006.
USPTO Transaction History of U.S. Appl. No. 09/764,021, filed Jan. 16, 2001, entitled "System and Method for an Online Speaker Patch-Through," now U.S. Patent No. 7,289,623.
USPTO Transaction History of U.S. Appl. No. 12/130,987, filed May 30, 2008, entitled "System and Methods to Provide Alternative Connections for Real Time Communications."

* cited by examiner

SYSTEM AND METHOD FOR AN ONLINE SPEAKER PATCH-THROUGH

CROSS-REFERENCE TO RELATED APPLICATIONS

The present application is a continuation of U.S. patent application Ser. No. 09/764,021, filed Jan. 16, 2001 entitled "System and Method for an Online Speaker Patch-Through," which is related to U.S. patent application Ser. No. 09/414,710, filed Oct. 8, 1999 entitled "System for Providing Services in Real-Time over the Internet," which is now abandoned. The entire contents of the above-referenced applications are incorporated herein by reference.

FIELD OF THE INVENTION

The present invention relates generally to electronic commerce using digital and analog networks. More specifically, the present invention relates to a network application for connecting clients with an alternate service provider if the selected service provider is unavailable.

BACKGROUND OF THE INVENTION

Consumers interested in acquiring services must first identify a service provider who is capable of providing the desired services. At present, this usually means perusing a telephone directory, which can become frustrating and time-consuming if the service providers telephoned are not immediately available. Also, a phone book (whether a bound paper book or an electronic directory) is also not very effective if the service provider's business category is not known.

Over the years, a number of systems have been developed that partially address this problem. In particular, these include systems that attempt to match potential customers with potential service providers. They range from free bulletin-board-style Internet web sites to sophisticated Internet-based consulting services.

One such system is similar to an electronic "marketplace." Users submit via the Internet a description of the services they need to an Internet-based "exchange." These descriptions include the subject matter of the requested service, time constraints for service delivery, and the proposed price to be paid for the services. The exchange then identifies potential service providers and facilitates bidding for the job by the selected service providers, some of whom may or may not have been selected previously by the user. Once the service providers' bids have been received by the user, the user sends a full job request to one or more service providers of particular interest. The service providers who remain interested in the proposed work then submit a final bid to the user. This bid may also include the service provider's particular qualifications and conditions for accepting the work. After the work has been completed, the service provider contacts the exchange for payment. Although this system is beneficial, users still do not immediately know if a service provider is available and the response from the service provider is neither immediate nor direct.

Another prior art system maintains a list of independent professors available for answering questions via the Internet. The system functions as a middleman between the customer and the professors. The customer contacts the system via the Internet with a question. The system then contacts various service providers within the appropriate field via the Internet and forwards the customer's question to the service providers. Here too, customers do not immediately know if a service provider is available, and the response from the service provider is not immediate.

There is another system that allows users to post via the Internet questions for service providers related to specific topical categories. However, there is no guarantee that a service provider will answer the question as the user does not pay for the services and the service providers are not paid. Again, presuming the service provider is willing to answer a question, users do not immediately know if a service provider is available and the response from the service provider is neither immediate nor direct.

Another system allows users to post questions to an electronic "bulletin board." Other users, whether service provider or not, provide answers or comments on a voluntary basis. This system, though useful, suffers from many of the same problems as the system described above.

What is needed is a system and method for a user to select an information provider and be connected to that provider in real time. What is further needed is a method and system for finding the user an alternate service provider when the service provider that the user has selected is not available.

SUMMARY OF THE INVENTION

The systems and methods described herein may be incorporated into a "service marketplace" system that matches users with potential information or service providers and establishes a real-time communications connection between the user and a selected information provider. In one embodiment, an alternate is selected for the user when the service provider that the user is trying to connect with cannot be reached. In an alternative embodiment, the alternates can be used in conjunction with the service provider that does connect with the user in order to provide a second opinion or possibly deeper background information. In one embodiment, the service providers can either be a live person at the other end of the connection or a recording. For example, the recordings can be used as samples for the user to test out before going on to the live service provider.

BRIEF DESCRIPTION OF THE DRAWINGS

The present invention is illustrated by way of example and not limitation in the figures of the accompanying drawings, in which like references indicate similar elements, and in which.

DETAILED DESCRIPTION OF THE INVENTION

The systems and methods of the present invention may be incorporated as part of a network application that establishes a real-time communications connection between an information provider and a customer or user through a communications network, such as telephone network, a computer network, wireless communications network, etc. The network application in one embodiment would be for a method of providing a user who has selected an information provider from a list or database with an alternative information provider. These alternative information providers could be used as replacements for the selected information provider if that service provider is absent when the user attempts a connection. The alternate information providers can also be supplemental to the selected information provider. The term information provider can refer to either a live service provider or a recording made by a service provider.

Figure 1:
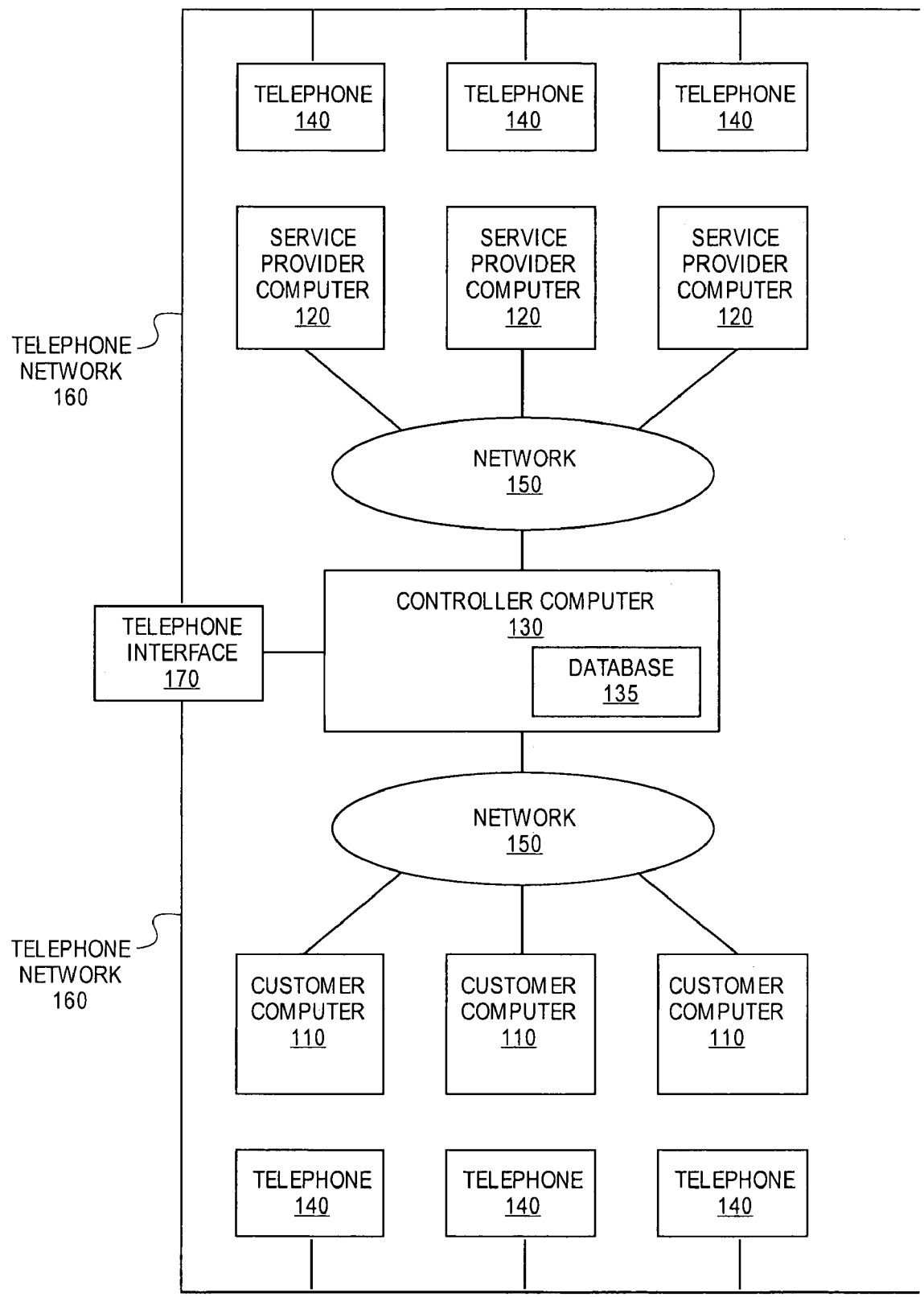
FIG. 1 illustrates a system for identifying information providers and connecting customers with information providers in accordance with one embodiment of the invention.
Figure 2:
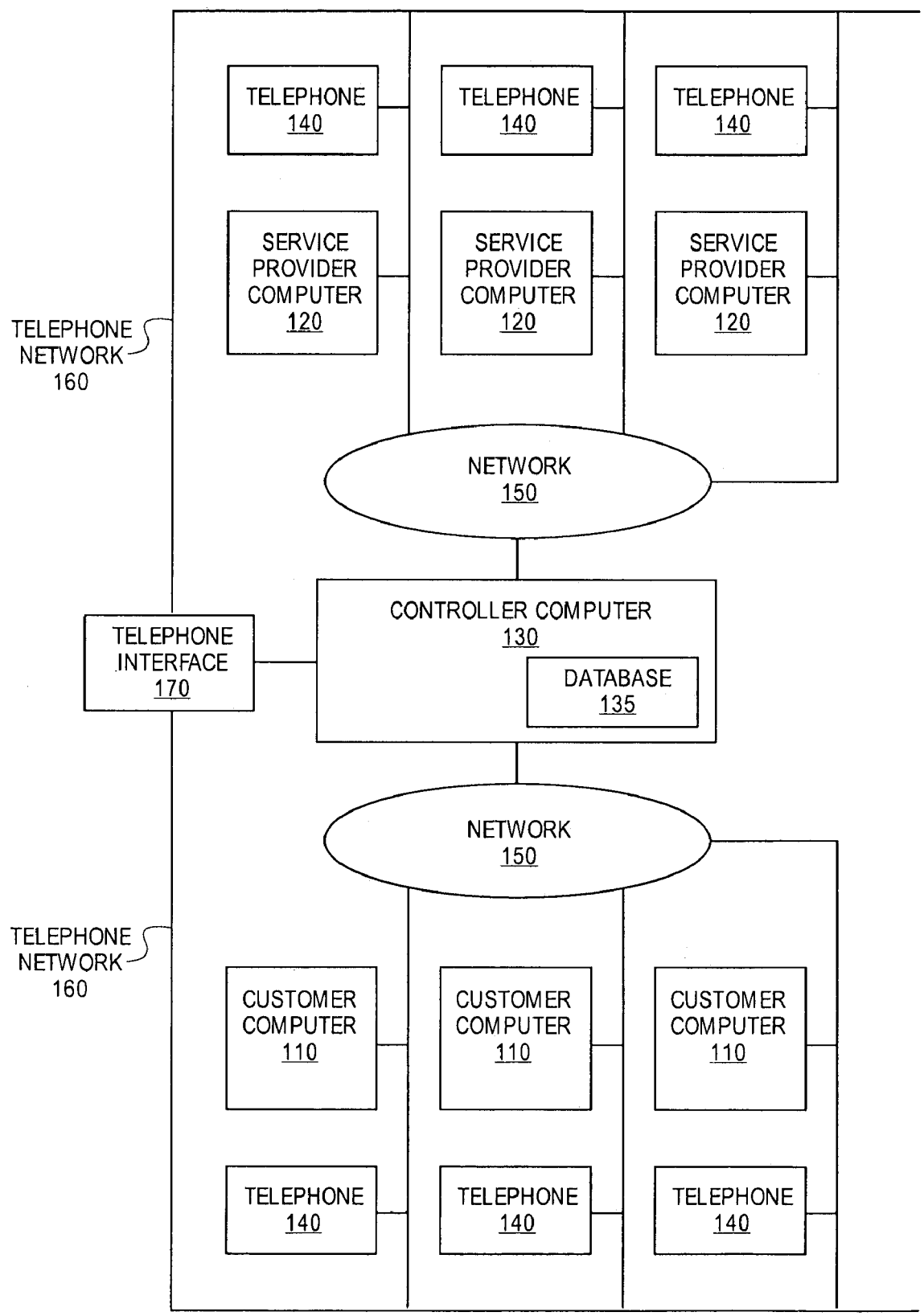
FIG. 2 illustrates an alternative embodiment of the system for identifying information providers and connecting customers with information providers.

FIG. 1 shows one embodiment of a system capable of incorporating one embodiment of the invention. User computers ("customer computers") 110 and information provider computers ("service provider computers") 120 are connected through a network 150 (such as the Internet) to a host computer or web server ("controller computer") 130. Persons skilled in the art will recognize that the controller computer 130 may consist of more than one computer working together to provide the controller computer functions described herein. The users (customers) and information providers (service providers) each have telephones 140 that are connected to the telephone network 160. In FIG. 1, the computer network 150 and telephone network 160 are shown as two separate entities, though persons skilled in the art will realize that they can overlap, as illustrated in FIG. 2.

In one embodiment, the controller computer 130 has the functionality of a standard web server, capable of interacting dynamically via the service provider computers 120 and the customer computers 110 with service providers and customers, respectively. In addition to the standard web server operation, the controller computer 130 is linked to a telephone interface 170 that enables the controller computer 130 to set up, initiate, confirm, and/or track conversations between the customers and service providers. The controller computer 130 has the ability to establish a real-time communications connection between service providers and customers to convey information in real-time in an interactive manner.

In accordance with the embodiment shown in FIG. 1, the customer computers 110 and the service provider computers 120 are connected to the controller computer 130 through the network 150. Customers and service providers use their computers to connect to the Internet network 150. Once a connection has been established, service providers and customers will enter the URL, or Internet address, of the controller computer 130, and a plurality of logic units 131-134 within the controller computer establishes a computer connection with the customer computer 110 and the service provider computer 120. In one embodiment, after the computer connection has been established between the controller computer 130 and the service provider and customer computers, 120 and 110, respectively, a plurality of logic units 131-134 within the controller computer presents a web page on the service provider and customer computers.

Typically, customers and service providers register before customers can purchase services or information and before service providers can offer their services or information through the web site. During registration, the customers and the service providers are requested to submit certain information, such as a username and password. Customers may be requested to submit credit card or other financial information. Service providers may or may not be requested to submit credit card or other financial information. Once the requested information has been submitted, the data is stored in the database 310 in an account set up for the service provider and in a user account set up for the customer.

A plurality of logic units 131-134 within the controller computer 130 may present a web page on the customer computer 110 and the service provider computer 120 through which the plurality of logic units 131-134 prompts the customer and the service provider to submit the requested registration information. The plurality of logic units 131-134 are linked with the database 135 and may automatically set up the accounts and automatically store the submitted registration information in the appropriate accounts on the database 135.

Service providers typically submit a description or a listing for each service they will provide through the web site. After the controller computer 130 has stored the description or listing, the service described may be offered to all of the users who browse the web site. Access to the web site may be established as described above, with the customer using a user computer ("customer computer") 110 to connect to a network 150 and then entering the URL of the controller computer 130. A logic unit of the plurality of logic units 131-134 within the controller computer 130 then establishes a computer connection with the customer computer 110.

After the computer connection has been established, in one embodiment customers will have the option of executing a keyword search for service providers. The keyword search can be executed from a web page presented by a logic unit of the plurality of logic units 131-134 of the controller computer 130 on the customer computer 110. In an alternative embodiment, the system can be accessed by a third party website. A keyword search typically consists of scanning a database for words that match the keywords entered. In this embodiment, the keyword search will be executed against the stored descriptions and listing data. In one embodiment, customers will view a list of service providers matching the keyword search criteria on a web page presented by the logic unit of the plurality of logic units 131-134 on the customer computer. Customers will have the option of viewing the service providers listed according to price, availability, or customer evaluations in either ascending or descending order, though the service providers can be listed in any number of ways. As an alternative to a keyword search, customers can select a category to view a predetermined list of service providers.

In an alternative embodiment in which the customer all ready knows the service provider that the customer wishes to contact, that customer can dial an 800 number to connect with the service provider. The customer enters the extension of the service provider, as well as the customer's personal identification number and the telephone number listed in the customer's personal information file. The system then attempts to connect the user with the service provider.

Figure 3:
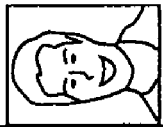
FIG. 3 illustrates one embodiment of an information provider's listing page.

In one embodiment, a logic unit of the plurality of logic units 131-134 within the system presents, in response to a customer selection of a service provider from the list, a listing page that contains additional information about the selected service provider and the selected information service. FIG. 3 illustrates an example of a listing page that provides more detailed information about a service provider that goes by the name of Jim. The listing page 300 shown in FIG. 3 provides a brief description the information services provided 310 and may also include rating information 320, a picture of the service provider 330, a rate or price per minute 340, as well as other information that the potential customer may find helpful such as the education background of the service provider 345. The listing page 300 may also include an icon with hyperlink 350 that shows whether or not the service provider is available, and if he is, it may provide hyperlinks that enable the customer to call 350 or email 355 the service provider. The information provided in a listing page may be conveyed in other forms, e.g., instead of a picture or photo 330 the service provider may choose to be represented with an avatar or other information-rich graphic, and may include other types of information in addition or instead of the information shown in the embodiment of FIG. 3.

When a customer decides to receive information, services, or just pleasant conversation from the service provider, the customer may request to have a real-time communications connection established with the service provider. For example, from the listing page illustrated in FIG. 3, a customer may click on the "Call Now" hyperlink 350 to send such a request and, in response, a logic unit of the plurality of logic units 131-134 within the system attempts to establish a real-time communications connection between the customer and the service provider. This real-time communications connection can take the form of a telephone connection, website chat, or voice connection over the Internet.

In one embodiment, if a connection should be attempted and the service provider proves to be unavailable to respond, a logic unit of the plurality of logic units 131-134 within the controller will initiate a search of the system's list of service providers for an alternate service provider. In one embodiment, the list of alternate service providers will be made up of service providers who match the selected service provider when compared using a pre-established set of criteria. The criteria can either be formulated ahead of time by the system administrator or entered into the system by the user. The criteria used could include subject matter and/or probably price.

In one embodiment, if the search fails to turn up a matching alternate service provider (e.g., appropriate expertise and price range, or whatever other criteria the system is using) the system will not give the user the option of accepting an alternate. If the search does turn up someone who meets all the appropriate criteria and the user accepts, the user will be connected through, or "patched through", to the available service provider.

In one embodiment, the service provider would be able to set up ahead of time a referral, as described above, in case a call should come while they were unavailable. For example, she can elect to have the call patched through to a backup service provider of her choice, have one selected from the database for her, or have the user just be told that the service provider was not available and to try back later. In one embodiment, if the service provider chooses to refer the call to someone else or to the database, that service provider will receive a percentage of whatever fees were earned. This may be an incentive for the service provider to refer.

Figure 4:
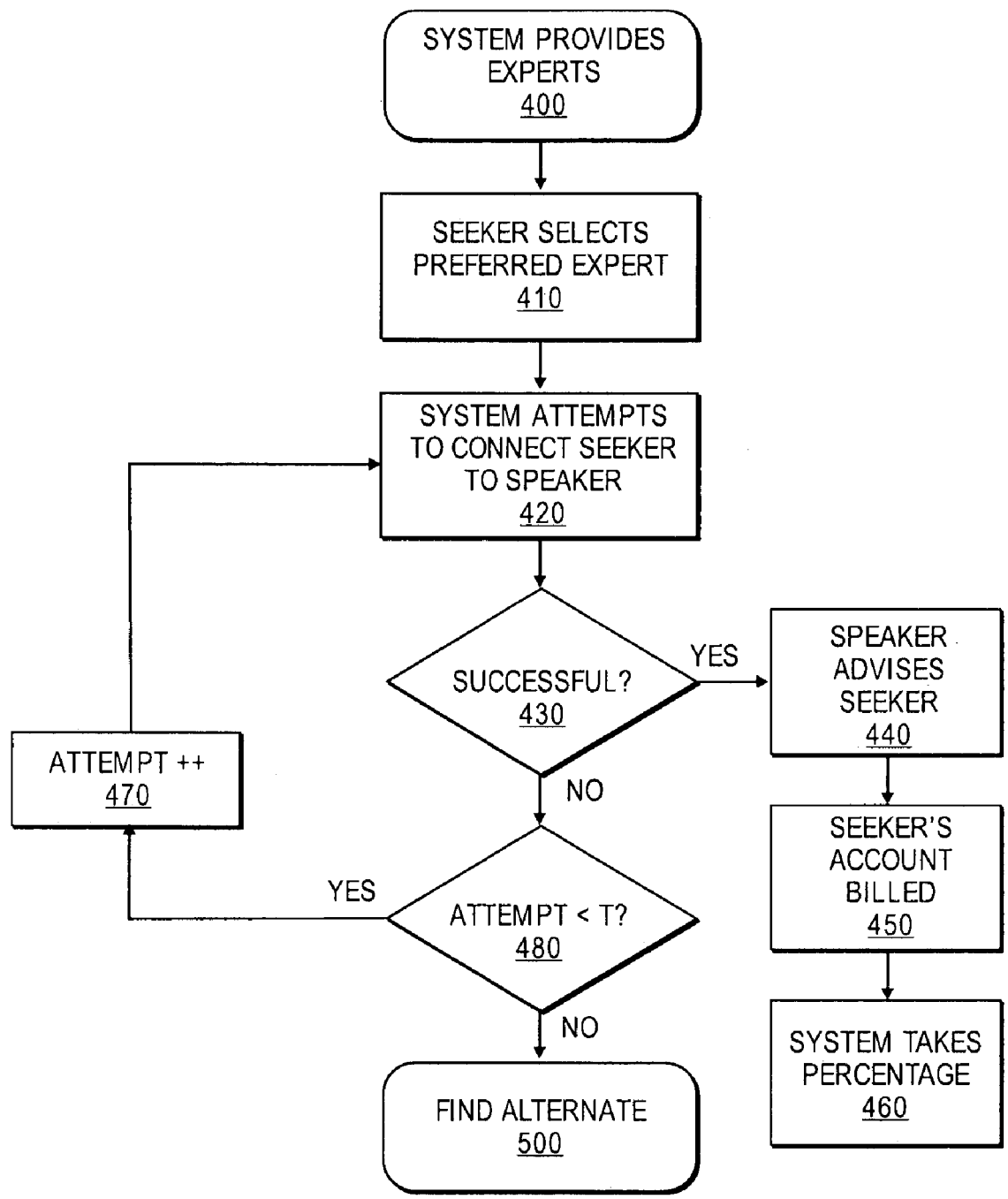
FIG. 4 diagrams in a flowchart an embodiment of a method performed when a user attempts to reach a service provider who is not available for communication FIG. 5 diagrams in a flowchart an embodiment for producing an alternate service provider for the user when the selected service provider is unavailable.

FIG. 4 shows one embodiment of a system for referral, or "patch-through". In step 400, the user, or "Seeker", is provided with a list of service providers, or "Speakers", on a topic of the Seeker's choosing. The Seeker selects a Speaker of his choosing in step 410. In step 420, the system then attempts to connect the Seeker with the Speaker in real time via a choice of methods as described above. If the connection is successful at step 430, then the system goes to step 440 and the Speaker and the Seeker will communicate in real time. In step 450, the Seeker's account is billed for the amount of time spent communicating with the Speaker at the Speaker's posted rate. The system then takes for itself in step 460 a percentage of the amount billed. If the connection is not successful the first time, the system will try again. In step 470, the system keeps track of how many attempts are made. In step 480, if the system has tried a predetermined number of times (T), then the system will try to find the Seeker an alternate Speaker in step 500.

Figure 5:
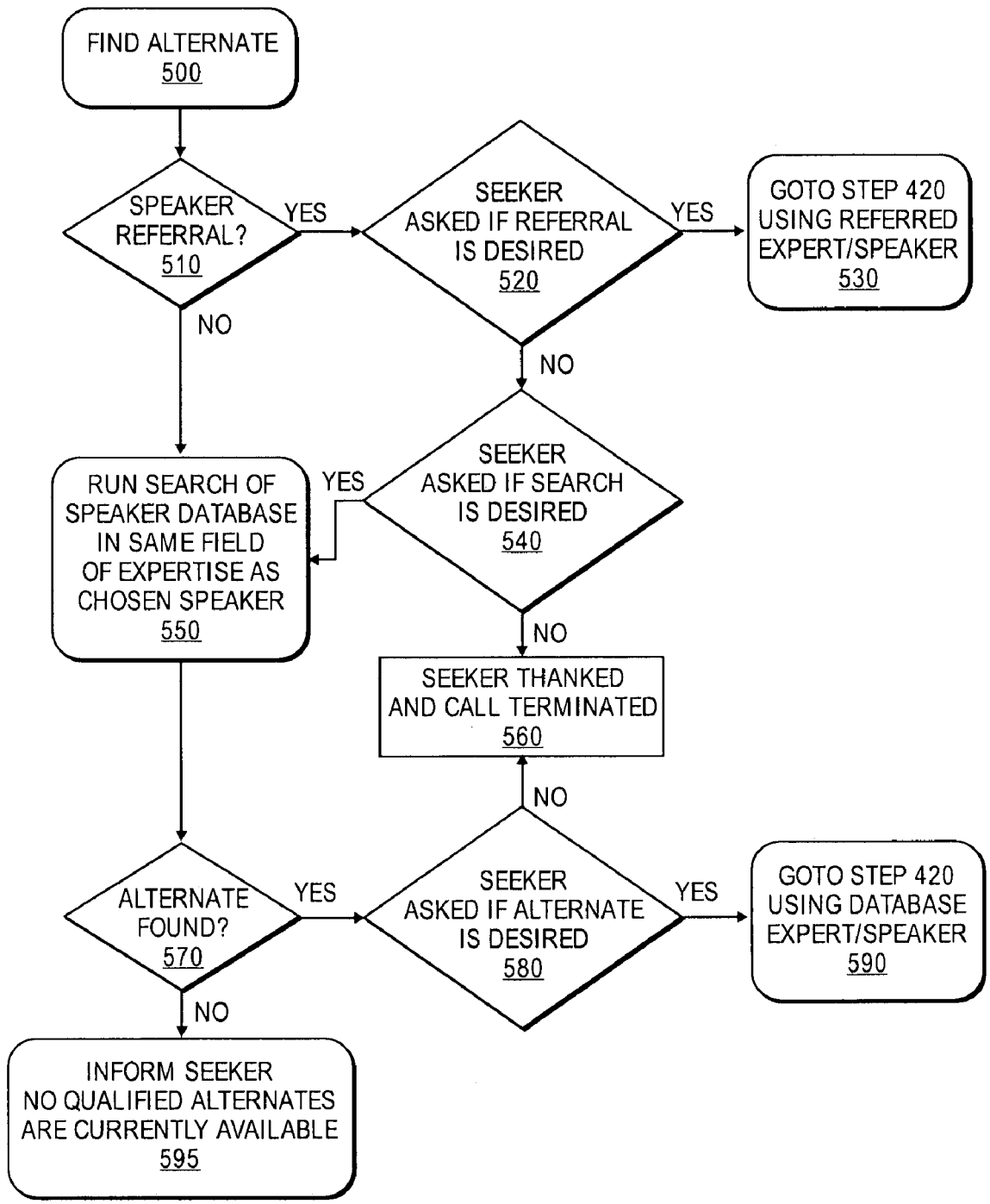

A method for Finding an alternate Speaker is shown in FIG. 5. First, in step 510 the system checks whether the Speaker has an arrangement with a second Speaker to refer to the second Speaker any Seekers for which the initial Speaker is not available. If the initial Speaker does have a "covering Speaker", then in step 520 the Seeker is asked if he wishes to use the covering Speaker. If the Seeker does want to communicate with the covering Speaker, then the system proceeds to step 530 and attempts to connect them using the method previously discussed 420. If the Seeker does not want to use the covering Speaker, the Seeker is asked in step 540 if they would prefer a Speaker selected from the database. If the Seeker does prefer the database option, then the system proceeds to step 550 and the database of Speakers is searched. The search could be limited to the Speakers in the same subject matter as the original Speaker. If the Seeker chooses not to have the database pick an alternate Speaker, the system proceeds to step 560 and the connection is terminated. If the system finds in step 570 an alternate Speaker, then in step 580 the Seeker is asked if he we wishes to communicate with the alternate Speaker. If the Seeker does want to use the alternate, then the system in step 590 attempts to connect them using the method previously discussed 420. If the system was unable to find a qualified Speaker, it then informs the Seeker of this in step 595. If the Seeker does not like the alternate Speaker selected, then the Seeker is thanked and the call is terminated as in step 560.

Figure 6:
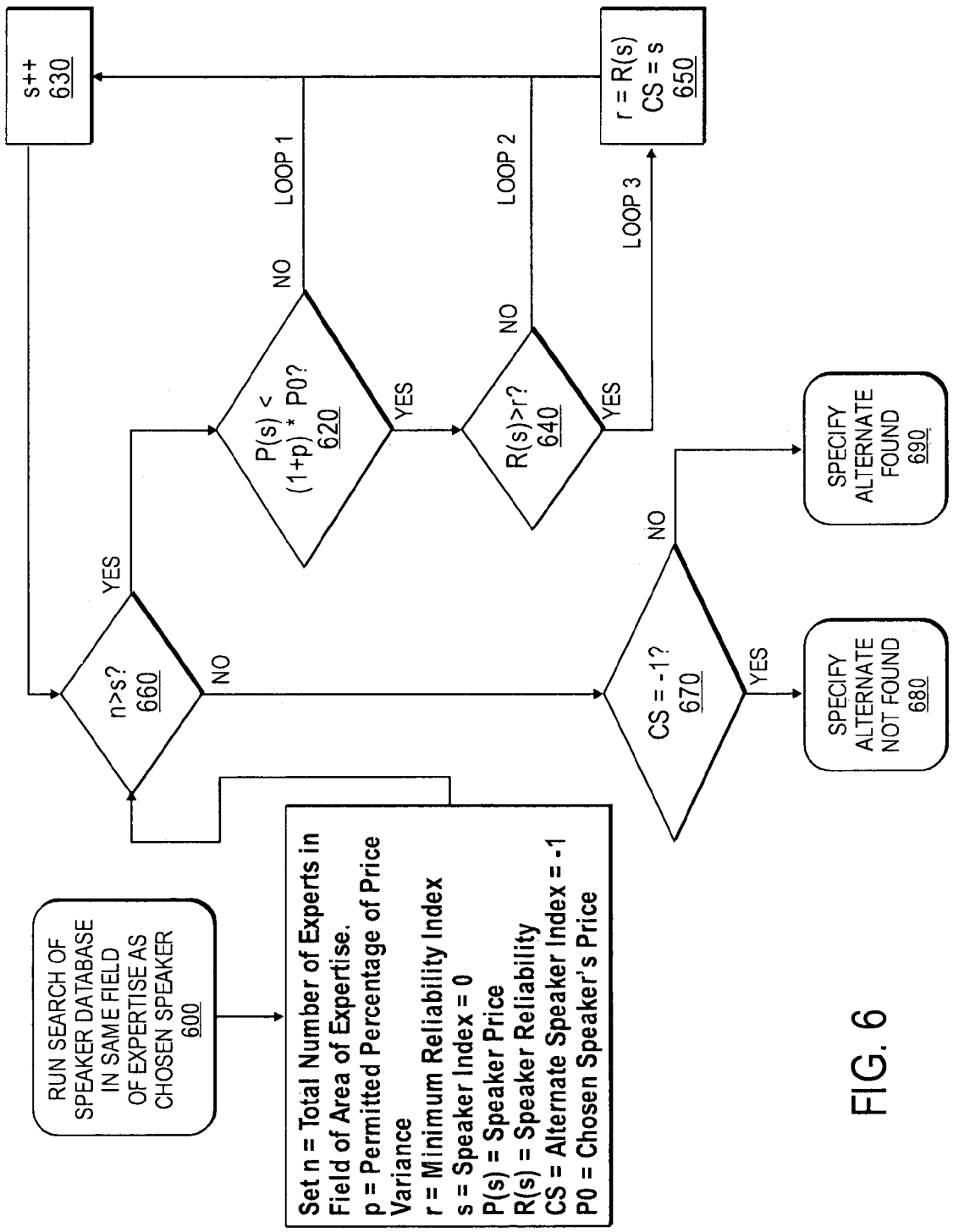
FIG. 6 diagrams in a flowchart an embodiment for selecting a service provider.

An exemplary embodiment for searching the database for an appropriate alternate Speaker is illustrated in FIG. 6. In one embodiment, the search would be limited to the Speakers in the same subject matter as the initial Speaker. Speakers are arranged by subject matter on the list of Speakers, simplifying the exclusion of Speakers that are not in the same category. In one embodiment, the search pool would also exclude the initial Speaker and any Speaker listed as being not available at that time.

Before starting the search, a set of parameters is initialized in step 610. In one embodiment, the total number of Speakers being sorted (n), an index number (s), and an alternate Speaker index (CS) could be used to keep track of whether all the Speakers in that field have been searched through and if any viable alternates have been found. The index number would indicate which Speaker in the pool the system is looking at and the alternate Speaker index would indicate the current Speaker (e.g. the least expensive, the most reliable, or other criteria deemed important). The nature of the other parameters depends on the type of criteria the system, or in some embodiments the user, want to use to sift through the database. For example, the criteria of price (P(s)) and reliability (R(s)) could be used. A set percentage (p) of the selected Speaker's price (P0) would be established as the maximum variance, while a minimum reliability index (r) is also set. The criteria p could be expressed as a decimal. One embodiment of the reliability index would be the number of successful connections between that Speaker and previous users divided by total number of connections attempted. First time Speakers could be given either a unity reliability index to make sure that new Speakers are not constantly ignored, or a zero reliability index to make it more likely that the Seeker will get somebody who will be there. The current Speaker could be judged against a reliability index of r and a price of (1+p) times P0. Other criteria, such as whether the Speaker is part of a recognized group, entity, or company, could be used as well. Alternate Speaker index CS is set to −1 or some other number that it could not possibly reach otherwise. This setting is selected so that the system knows whether or not any viable alternate Speaker was found. Speaker index s is set to 0 to examine the first Speaker in the field.

The algorithm displayed is rather simple. In step 620, the price for Speaker 0 is checked against the selected Speaker's price. If the price is greater than or equal to the maximum tolerance for the initial Speaker's price, the system follows Loop 1 in FIG. 6 and increments the Speaker index s at step 630. If the price for Speaker 0 is less than the maximum tolerance for the initial Speaker's price, then the system moves to step 640 and the reliability index is considered. If the reliability index is less than or equal to the minimum reliability index r, the system follows Loop 2 and increments the Speaker index s at step 630. If the reliability index of Speaker s is greater than the minimum reliability index r, then the alternate Speaker index CS is set to the index of that Speaker s in step 650. Additionally in step 650, the reliability index for that Speaker becomes the new minimum reliability index r. The system follows Loop 3 and increments the Speaker index at step 630. If the Speaker index s is less than the total number of Speakers n at step 660, then the process is repeated. If not, then the alternate Speaker index CS is examined at step 670. If the alternate Speaker index CS equals −1, or whatever other impossible number it was originally set to, then this means that no alternate Speaker was found, and such a message is sent to the Seeker at step 680. If alternate Speaker index CS equals a positive integer, then the Speaker noted by that index is selected as the alternate Speaker at step 690. In theory, this will be the Speaker with the highest reliability index, or the first Speaker found at that index.

The algorithm is only exemplary and can be altered to suit the needs of the system manager. For example, the Speaker with the lowest price could be sought out, or the lowest price at the highest reliability index. In addition, other criteria can be introduced into the system and the algorithm could be adjusted accordingly. The current algorithm can also be altered to increase speed and efficiency.

Figure 7:
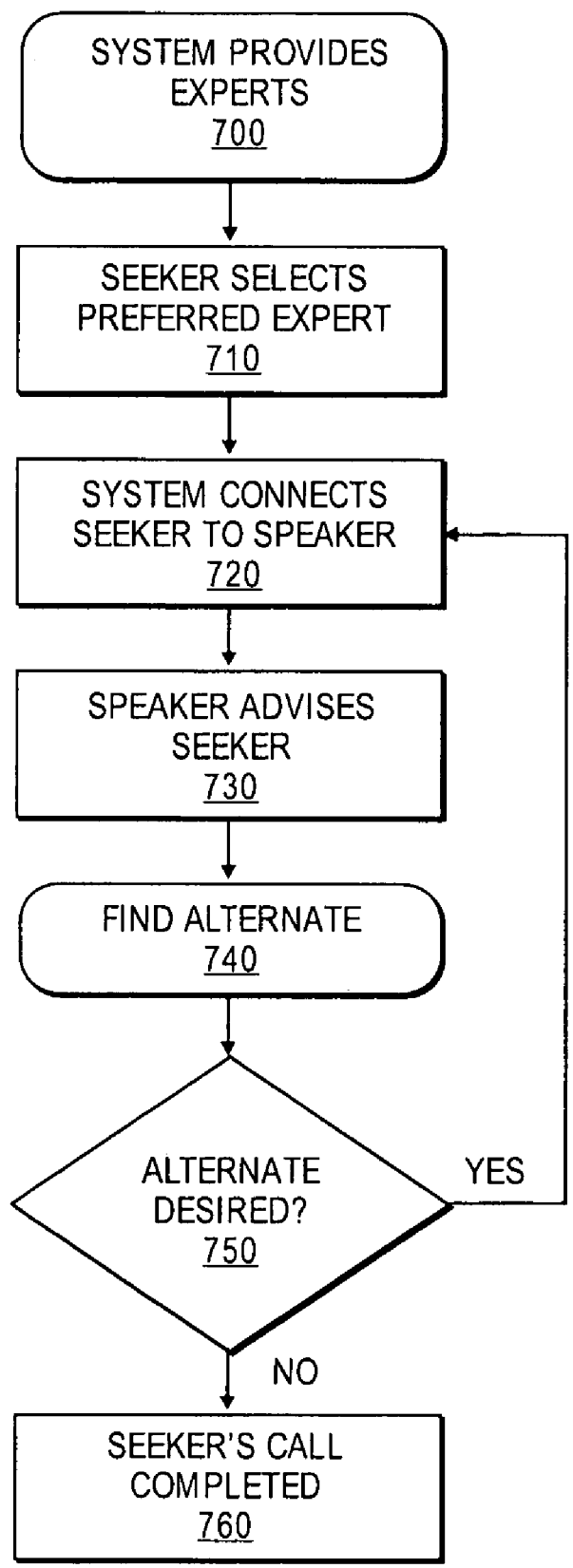
FIG. 7 diagrams in a flowchart an alternate embodiment of a method performed when a user attempts to reach a service provider.

The search for alternate Speakers does not apply solely to occasions where the initial Speaker is unable to reply. An alternate Speaker could be provided to supplement the advice of the initial Speaker. An exemplary embodiment of this is shown in FIG. 7. As before, the system provides a list of service providers at step 700 and the Seeker chooses the one he prefers at step 710. The system then connects the Seeker with the Speaker at step 720, and the Speaker advises the Seeker as before in step 730. As embodied here, the system searches the database for alternate Speakers at step 740 after the initial Speaker advises the Seeker, but this search can occur anytime after the Seeker has selected a Speaker. At step 750, the Seeker would be asked whether he desires to hear a second opinion from a second Speaker. If he does, the system will then connect him with the alternate Speaker, as it did in step 720. If not, the Seeker's call is completed 760.

The information providers are not necessarily limited to live service providers. A service provider can pre-record information on a topic that can be played over the telephone for the user who has selected it. These recorded answers could be used standing alone or to complement an existing live-answer service provider, another recorded service provider, or another recording by the same service provider. Additionally if the service provider should be unable to respond to a connection, she could have a previously prepared tape on the listed subject that the user could be referred to.

An alternate embodiment would be for a user that has communicated with a service provider to hear recorded materials on that subject. Additionally, a user that has listened to a recording could then choose to hear more from the person in question, either live or by a recording on a different subject.

One embodiment would be a form of advertising. The user could select a cheaper recording by the desired service provider. After having listened and evaluated the recording, the user could then choose to pay more to hear the person live. This way impulse buying of service provider opinions could be increased, in addition to giving the user a less expensive method of evaluating the service provider's skills and knowledge before purchase. In one embodiment, the user could receive a condensed version of the information from the recording then go in depth with the live service provider.

Figure 8:
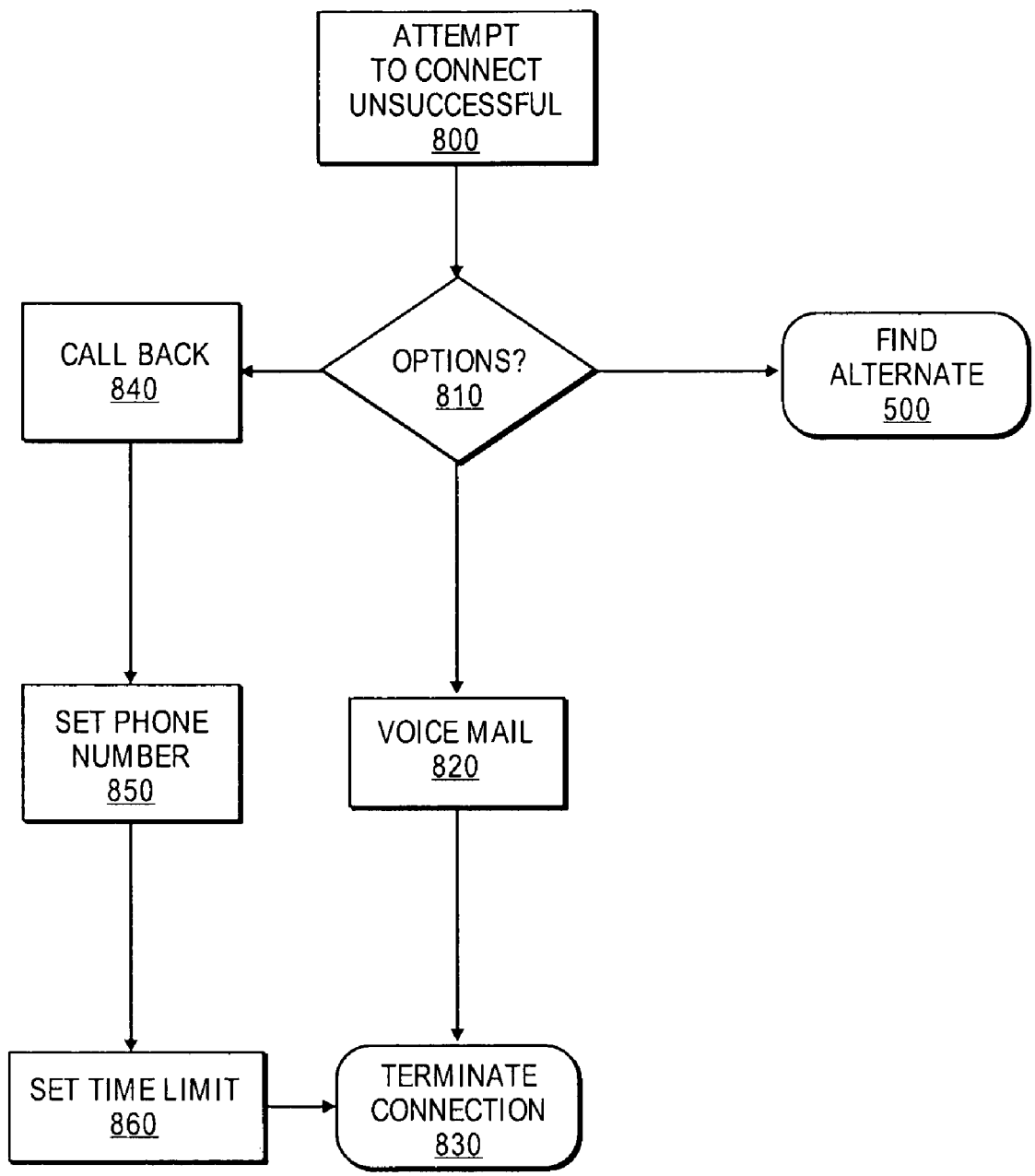
FIG. 8 diagrams in a flowchart an alternate embodiment of a callback method in the event that a connection attempt between service provider and user is unsuccessful.

In an alternative embodiment illustrated by the flowchart of FIG. 8, the patch-through need not connect the user with an alternate service provider if the user decides against having an alternate. This embodiment would attempt to connect the user with a service provider. In the event that the attempts to connect with the alternate service provider prove unsuccessful 800, the user is provided with a set of options 810. The user can choose to be provided with an alternate provider 500, in which case the system would follow the method illustrated on the flowchart of FIG. 5. The user could also choose to leave a message on voice mail 820, then have the connection terminated 830. In an alternate embodiment, the user could choose to have the service provider call them back 840. The user would set the phone number at which the user would be contacted 850, and set a time limit within which the service provider was to call 860. After the call back is set up, the connection would be terminated 830.

When the systems and methods of the present invention are incorporated as part of a network application that establishes a real-time communications connection between an information provider and a customer or user through a communications network, the possibility that the user will actually connect with an information provider increases. In addition, by supplementing the provider's information service with second opinions or informational recordings, the user is given a more complete experience by the application. By allowing customers to screen service providers by first listening to recordings by the service providers before being patched through to the live service provider, customer satisfaction can also be increased.

The method and apparatus disclosed herein may be integrated into advanced Internet- or network-based knowledge systems as related to information retrieval, information extraction, and question and answer systems. FIG. 6 is an example of one embodiment of a computer system. The system shown has a processor 601 coupled to a bus 602. Also shown coupled to the bus are a memory 603 which may contain instructions 604. Additional components shown coupled to the bus are a storage device 605 (such as a hard drive, floppy drive, CD-ROM, DVD-ROM, etc.), an input device 606 (such as a keyboard, mouse, light pen, bar code reader, scanner, microphone, joystick, etc.), and an output device (such as a printer, monitor, speakers, etc.). Of course, an exemplary computer system could have more components than these or a subset of the components listed.

The method described above can be stored in the memory of a computer system (e.g., set top box, video recorders, etc.) as a set of instructions to be executed. In addition, the instructions to perform the method described above could alternatively be stored on other forms of machine-readable media, including magnetic and optical disks. For example, the method of the present invention could be stored on machine-readable media, such as magnetic disks or optical disks, which are accessible via a disk drive (or computer-readable medium drive). Further, the instructions can be downloaded into a computing device over a data network in a form of compiled and linked version.

Alternatively, the logic to perform the methods as discussed above could be implemented in additional computer and/or machine readable media, such as discrete hardware components as large-scale integrated circuits (LSI's), application-specific integrated circuits (ASIC's), firmware such as electrically erasable programmable read-only memory (EEPROM's), etc.

Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A system comprising:
a first logic unit to provide a list of service providers to a user, indicating an availability of each of the service providers;
a second logic unit to receive a selection from the user of a service provided by a selected service provider;
a third logic unit to attempt to establish a real-time communications connection between the user and the selected service provider; and
a fourth logic unit to search a database of service providers for an alternate service provider based on a pre-established set of criteria and to offer the user an option of connecting with the alternate service provider.

2. The system of claim 1, wherein the fourth logic unit presents the alternate service provider if the user fails to connect with the selected service provider.

3. The system of claim 1, wherein the fourth logic unit presents the alternate service provider after the user has completed the real-time communications connection with the selected service provider.

4. The system of claim 1, wherein the selected service provider is an information provider.

5. The system of claim 4, wherein information provided by the information service provider is provided as a recorded transmission.

6. The system of claim 4, wherein information provided by the information service provider is provided as a communication with a live person.

7. The system of claim 1, wherein the selection from the user of the selected service provider is received over a telephone connection.

8. The system of claim 1, wherein the selection from the user of the selected service provider is received over an Internet connection.

9. The system of claim 1, wherein the pre-established set of criteria includes a rate of the alternate service provider.

10. The system of claim 9, wherein the rate is determined to be a match if the rate is within a predetermined range of the rate of the selected service provider.

11. The system of claim 1, wherein the pre-established set of criteria includes subject matter.

12. The system of claim 1, wherein the pre-established set of criteria includes a combination of separate criteria.

13. The system of claim 1, wherein a system administrator establishes the pre-established set of criteria.

14. The system of claim 1, wherein the user establishes the pre-established set of criteria.

15. The system of claim 1, wherein the pre-established set of criteria includes a reliability factor.

16. The system of claim 15, wherein the reliability factor consists of a ratio of successful connections between the alternate service provider and previous users of a service provided by the alternate service provider to total attempts between the alternate service provider and previous users of the service provided by the alternate service provider.

17. A method comprising:
sending, via a computing device, a user a list of personal service providers with an availability of each of the personal service providers indicated;
receiving, via the computing device, from the user a selection of a selected personal service provider;
attempting, via the computing device, to establish real-time communications between the user and the selected personal service provider; and
offering, via the computing device, the user an option to connect to an alternate personal service provider.

18. A method comprising:
giving a selected personal service provider an option of connecting, via a communication network, a user to a database of personal service providers when the selected personal service provider can not be reached;
searching the database, via a computing device, for at least one matching alternate personal service provider that matches the selected personal service provider based on a pre-established set of criteria; and
providing, via the communication network, the user with a list of the at least one matching alternate personal service provider.

19. A tangible machine-readable storage medium storing instructions which when executed by a computing device cause the computing device to perform a method comprising:
sending a user a list of personal service providers with the availability of each personal service provider indicated;
receiving from the user a selection of a selected personal service provider;
attempting to establish real-time communications between the user and the selected personal service provider; and
offering the user an option to connect to an alternate personal service provider.

* * * * *